M. W. WHITE.
RUBBER SOLED SHOE.
APPLICATION FILED MAR. 24, 1915.

1,215,449.

Patented Feb. 13, 1917.
2 SHEETS—SHEET 1.

INVENTOR
Melbourne W. White

M. W. WHITE.
RUBBER SOLED SHOE.
APPLICATION FILED MAR. 24, 1915.
1,215,449.
Patented Feb. 13, 1917.
2 SHEETS—SHEET 2.
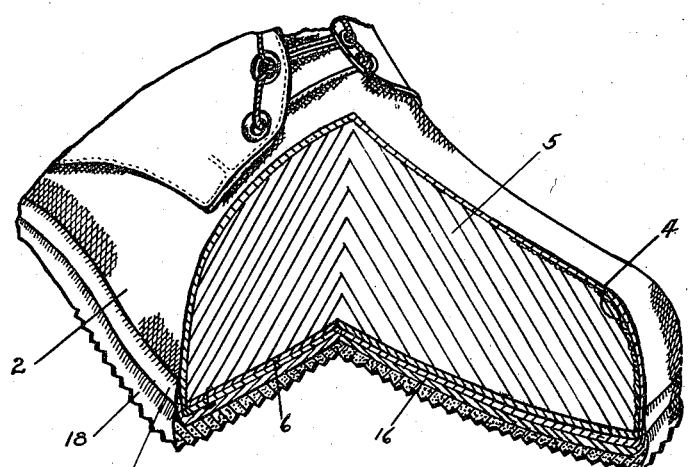
Fig. 4.
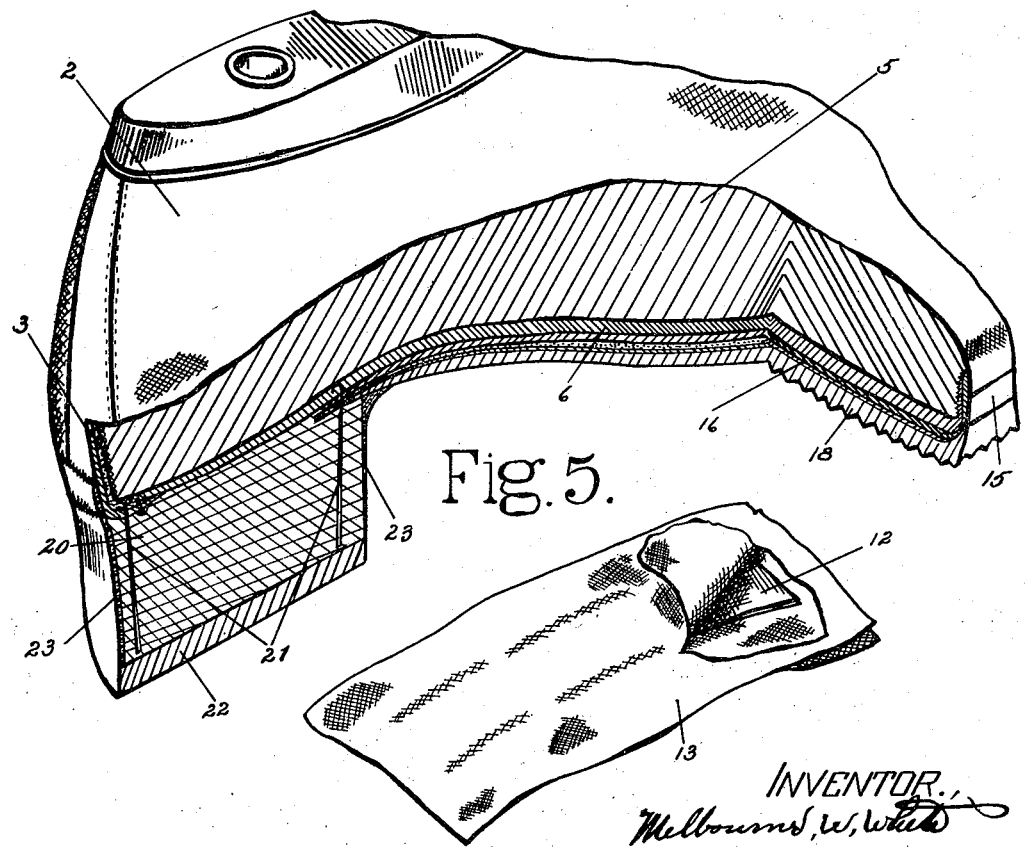
Fig. 5.
Fig. 6.
INVENTOR.
Melbourne W. White

UNITED STATES PATENT OFFICE.

MELBOURNE W. WHITE, OF CLIFTONDALE, MASSACHUSETTS, ASSIGNOR TO UNITED SHOE MACHINERY COMPANY, OF PATERSON, NEW JERSEY, A CORPORATION OF NEW JERSEY.

RUBBER-SOLED SHOE.

1,215,449.   Specification of Letters Patent.   Patented Feb. 13, 1917.

Application filed March 24, 1915. Serial No. 16,718.

*To all whom it may concern:*

Be it known that I, MELBOURNE W. WHITE, a citizen of the United States, residing at Cliftondale, in the county of Essex and State of Massachusetts, have invented certain Improvements in Rubber-Soled Shoes, of which the following description, in connection with the accompanying drawings, is a specification, like reference characters on the drawings indicating like parts in the several figures.

This invention relates to rubber soled shoes and particularly to a novel process of making such shoes.

Up to the present time the manufacture of rubber soled shoes has been confined to two distinct types of shoes, namely, welt and McKay sewed shoes in which sheet rubber soles are stitched to welts or middle soles, and fabric upper shoes, commonly termed "sneakers," which have composition rubber soles vulcanized to the bottoms of the shoes. The sneakers, while providing a cheap summer shoe for outdoor wear, have two objectionable characteristics. They sweat the feet because, according to the method by which they have heretofore been manufactured, the innersole is necessarily made of a vulcanizable composition. Also they are relatively shapeless and lack the neat appearance desired in a shoe. This is because it is not practicable to last the shoe in the ordinary way since the composition innersole will not hold lasting tacks and the only shaping to the last which sneakers receive is effected by pulling the upper with the fingers and sticking the margin of the upper to the innersole by cement. The upper cannot be properly lasted in this manner, first, because the operator cannot apply sufficient tension to the upper by his fingers and, secondly, if it were practicable by this method to apply sufficient tension the adhesive by which the edge of the upper is secured to the innersole would not hold the upper so tensioned.

While the welt and McKay sewed rubber soled shoes are more shapely and attractive, they are heavy and clumsy particularly for summer wear, since the rubber sole must be of extra thickness in order to enable it to be sewed to the shoe and to hold the stitches during wear. Moreover, these soles are of comparatively expensive composition and soon wear out.

The present invention has for its principal object a process of making rubber soled shoes in which the objectionable features of the above mentioned shoes are eliminated and whereby a neat appearing light shoe may be produced at a cost far below that of shoes having rubber soles secured by stitching and little, if any, greater than the cost of manufacturing sneakers according to methods heretofore used.

The novel shoe produced by the process of the present invention is not claimed herein but forms the subject-matter of my copending application Serial No. 108,686 filed July 11, 1916.

One manner in which the novel method of my invention may be successfully practised will now be described and is illustrated in the accompanying drawings, which also illustrate novel shoes embodying my invention, and in which,—

Fig. 4 is a section through the toe on an enlarged scale;

Fig. 5 is a section in the shank and heel portions on a similar scale; and

Fig. 6 is a view of the preferred shank stiffener ready for application to a shoe.

Figure 1:
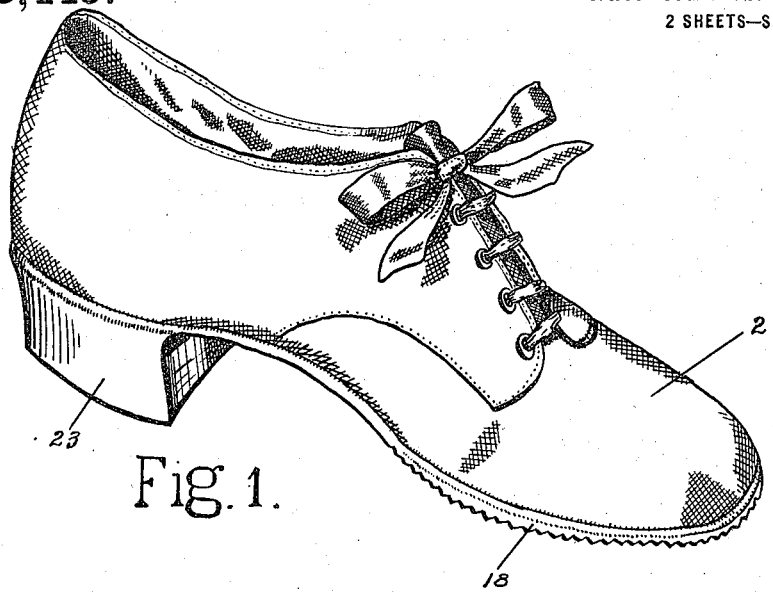
Figure 1 is a perspective view of a completed shoe made in accordance with this invention.

In carrying out the process of this invention in one manner in which it has been successfully practised, the shoe upper 2 of leather, canvas or other fabric is first provided with a fiber heel stiffener 3 of suitable shape inserted between two plies of the upper stock. The toe portion of the upper is preferably given permanence of shape by stiffening the upper either with materials applied in liquid form to the upper or by an inserted toe stiffener 4, Fig. 4. This upper is then assembled upon a last 5 which is of metal and preferably aluminum alloy, together with an innersole 6 of fibrous material, which may be leather or any of the fibrous substitutes for leather. The term "fibrous innersole" will hereinafter be used to designate generally an innersole of any fibrous material. In practising the process I have successfully used an innersole composed of a vegetable fiber made according to the sulfite process, which I have found will successfully withstand without injurious effects the high degree of heat required to vulcanize the outersole to the shoe.

Figure 2:
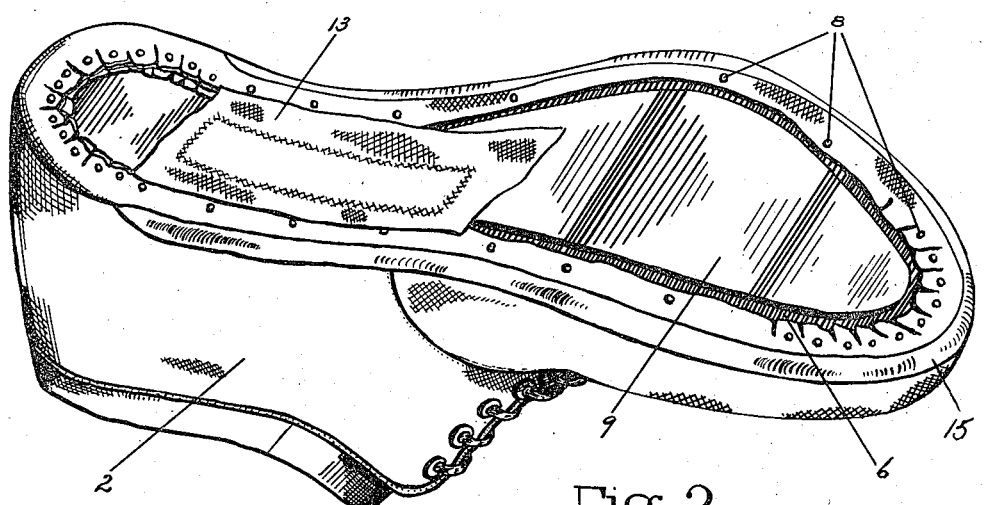
Fig. 2 shows the shoe after lasting but before the application of the sole and heel.
Figure 3:
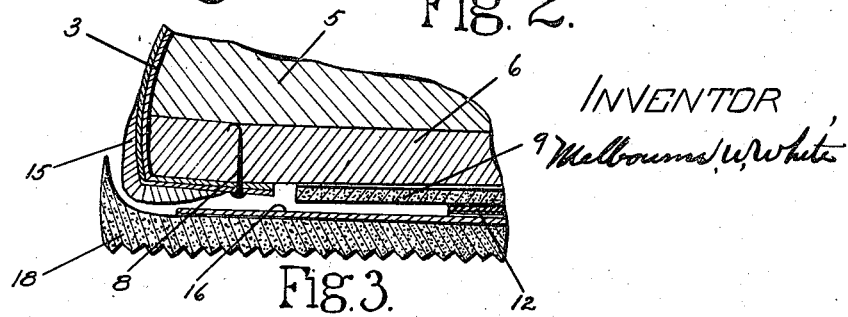
Fig. 3 is an enlarged sectional detail illustrating the arrangement of the various bottoming materials.

The assembled shoe is now lasted, as shown in Fig. 2, preferably on the hand method type of lasting machine which stretches and shapes the upper to the contour of the last the same as a McKay or welt shoe is shaped and permanently secures the tensioned upper to the innersole by lasting tacks 8 driven through the marginal edge of the lasted upper and the innersole and clenched on the bottom of the metal last. The bottom of the shoe, after it has been lasted, is then made level for the reception and even support of the outersole by filling the space within the overlasted edge of the upper with a vulcanizable composition or filler 9. When the shoe is to be provided with a heel, a shank stiffener is preferably employed, and a novel arrangement is adopted in this respect as well as in the means for securing the shank stiffener in position on the shoe. To cause the stiffener to be securely attached to the vulcanizable bottoming materials, the stiffening element 12, which is preferably of spring metal, is first placed between sheets or folds 13 of friction fabric as shown in Fig. 6, so as to provide the stiffening element with laterally projecting attaching fins. The stiffener so constituted is placed on the filler 9 with its rear end on the heel seat, or in the rear of the location for the breast of the heel and after the outersole has been applied the stiffener is securely vulcanized in place, becoming practically a part of the filler and outersole which make a cushion above and below it and produce a strong and yet exceedingly comfortable construction for the shoe. A vulcanizable strip 15 of high grade rubber called "foxing" is then applied around the side of the shoe near the edge and is lapped in over the lasted-in margin of the upper on the shoe bottom. A "binder" of friction fabric 16 is now applied to the bottom of the shoe, the binder overlapping the inner margin of the foxing. The outersole 18, died out from a sheet of calendered rubber or rubber-like composition, is then applied to the shoe bottom and after being accurately placed to extend over the margin of the rubber foxing to the edge of the shoe, is forced firmly against the shoe bottom as by rolling pressure to conform it to the contour of the bottom of the last.

If the shoe is to have a heel, as herein shown in Figs. 1 and 5, the formed heel 20 which may or may not be of vulcanizable material may now be attached. Preferably the heel consists of fiber stock, such for example as that employed for the innersole, and is fastened to the shoe by heel attaching nails 21 extending through the heel and the heel seat portion of the innersole and clenched upon the metallic bottom of the last. The sole need not extend to the rear end of the shoe but may terminate a short distance back of the breast line, thus saving the expensive sole stock. The heel is preferably provided with a rubber toplift 22. After the heel has been attached it is covered with a sheet of rubber 23 which will preferably lap over the edge of the heel and extend for a short distance over the adjacent portion of the upper so as to constitute portion of the counter portion of the shoe substantially a continuation of the foxing 15. This covering 23 adheres to the underlying surfaces of the heel and upper and when vulcanized it becomes permanently attached to said surfaces and constitutes a water-excluding envelop having an appearance uniform with the outersole and the foxing. For some classes of shoes the rubber covering may be omitted and in that case the shoe may, if desired, be vulcanized before the heel is applied and the heel then nailed on as in the manufacture of all leather shoes.

The shoe is now placed in a vulcanizing apparatus where it remains from 12 to 24 hours at a temperature of from 200 to 300 degrees F. during which time the rubber and rubber-like composition are thoroughly cured and vulcanized. During this step in the process all of the vulcanizable portions of the shoe including the outersole and the foxing form a substantially integral body and become permanently attached to the overlasted margin of the upper, the heads of the lasting tacks, the shank stiffener and the filler.

The rubber soled shoes produced by the herein described process are far superior to sneakers in both appearance and fit and they are more comfortable, particularly for summer wear, since the fiber innersole provides an effective insulation or protection for the wearer's feet from the drawing and sweating action of a rubber-composition innersole material, such as heretofore used. Moreover, the expense involved in the manufacture of the shoes of this invention is substantially no greater than the cost of manufacturing sneakers. The difference in this respect is indicated by the fact that the upper for the shoes of this invention are cut a size smaller than the uppers which are lasted by the fingers thereby effecting a saving in upper stock which is equal to the cost of the lasting and tacking operation.

Having thus described the invention, what I claim as new and desire to secure by Letters Patent of the United States is:—

1. That improvement in the method of making shoes which consists in assembling on a last an upper and a fiber innersole which has sufficient body to adapt it for holding metallic fastenings, stretching the upper about the last and securing it under tension to the innersole by metallic fastenings, applying vulcanizable outersole material to the bottom of the shoe and uniting the outersole material to the edge of the upper and the fiber innersole by vulcanization.

2. That improvement in the method of making shoes which comprises assembling on a last a fabric upper and a vegetable fiber innersole which has sufficient body to adapt it for holding lasting tacks, lasting the upper step by step in the usual manner and securing it under lasted tension to the innersole by the usual lasting tacks, applying vulcanizable outersole material to the bottom of the shoe and uniting the outersole material to the overlasted edge of the upper and to the fiber innersole by vulcanization.

3. That improvement in the method of making shoes which consists in assembling an upper, a counter and a fiber innersole on a last, lasting the upper over on the innersole and permanently securing it to the innersole, applying a shank stiffener to the shoe, applying vulcanizable outersole material, shaping said material to the bottom of the shoe, attaching a fiber heel to the shoe, and uniting the outersole material to the overlasted edge of the upper and the fiber innersole by vulcanization.

4. That improvement in the method of making shoes which consists in assembling on a last an upper and a fiber innersole, lasting the upper over on the innersole and permanently securing it to the innersole, applying a filler of vulcanizable material in the space within the overlasted edge of the upper, applying a covering sheet of friction fabric over the entire shoe bottom, applying vulcanizable outersole material, shaping said material to the bottom of the shoe and uniting the bottoming materials and the upper by vulcanization.

5. That improvement in the method of making shoes which consists in assembling on a last an upper and a fiber innersole, lasting the upper over on the innersole and permanently securing it to the innersole under tension, applying a filler of vulcanizable material shaped to occupy the space within the overlasted edge of the upper, locating a shank stiffener incased between two sheets of friction fabric upon the filler, applying a vulcanizable outersole and subjecting the bottoming materials to a vulcanizing heat.

6. That improvement in the method of making shoes which consists in assembling on a metal last an upper and a fiber innersole which has sufficient body to adapt it for holding metal fastenings, lasting the upper over upon the innersole and permanently securing it to the innersole under tension by metallic fastenings, applying a filler of vulcanizable material shaped to occupy the space within the overlasted edge of the upper, locating a shank stiffener which is incased between two sheets of friction fabric upon the filler, applying a foxing along the lower edge of the shoe, applying a connecting sheet of friction fabric over the filler and the edge of the upper, applying an outersole of vulcanizable material, shaping said outersole material to the bottom face of the shoe and over the foxing and permanently uniting said bottoming materials and the upper by vulcanization.

7. That improvement in the method of making shoes which consists in assembling on a last a fiber innersole and a fabric upper having a fiber counter and a toe stiffener, stretching the upper about the last and permanently securing it under tension to the innersole, locating a shank stiffener on the bottom of the shoe, attaching a fiber heel to the shoe, applying vulcanizable outersole material to the shoe bottom, and uniting the outersole material to the upper and innersole by vulcanization.

8. That improvement in the method of making shoes which consists in assembling a fabric upper having a fiber counter and a toe stiffener on a last together with a fiber innersole which has sufficient body to adapt it for holding metallic fastenings, stretching the upper about the last and permanently securing it under tension to the innersole by metallic fastenings, applying a filler of vulcanizable material to the lasted shoe bottom, locating a shank stiffener upon the filler, permanently attaching a fiber heel to the shoe, applying vulcanizable outersole material to the shoe bottom, and then subjecting the shoe bottoming materials to a vulcanizing heat.

In testimony whereof I have signed my name to this specification.

MELBOURNE W. WHITE.